No. 862,524. PATENTED AUG. 6, 1907.
W. H. H. STEVENSON.
CAN HEADING MACHINE.
APPLICATION FILED AUG. 29, 1906.

3 SHEETS—SHEET 1.

Attest
C. S. Maxwean
Edward N. Sarton

Inventor
W. H. H. Stevenson
by Spear, Middleton, Donaldson & Spear
Attys.

No. 862,524. PATENTED AUG. 6, 1907.
W. H. H. STEVENSON.
CAN HEADING MACHINE.
APPLICATION FILED AUG. 29, 1906.
3 SHEETS—SHEET 2.
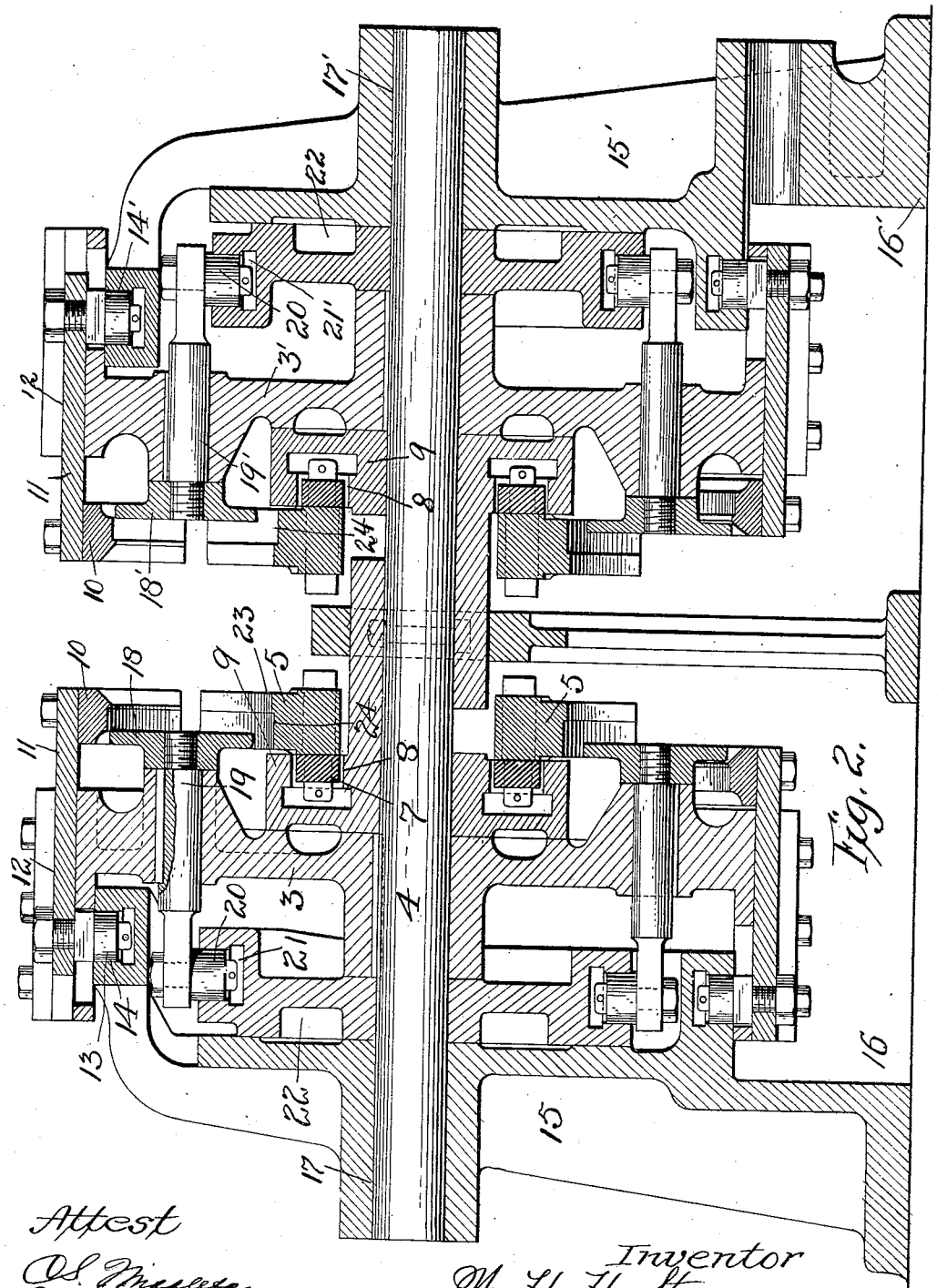

No. 862,524. PATENTED AUG. 6, 1907.
W. H. H. STEVENSON.
CAN HEADING MACHINE.
APPLICATION FILED AUG. 29, 1906.

3 SHEETS—SHEET 3.

Attest
O. S. Madison
Edward N. Saxton

Inventor
W. H. H. Stevenson
By Spear, Middleton, Donaldson & Spear
Attys.

THE NORRIS PETERS CO., WASHINGTON, D. C.

UNITED STATES PATENT OFFICE.

WILLIAM H. H. STEVENSON, OF BALTIMORE, MARYLAND.

CAN-HEADING MACHINE.

No. 862,524.

Specification of Letters Patent.

Patented Aug. 6, 1907.

Application filed August 29, 1906. Serial No. 332,486.

*To all whom it may concern:*

Be it known that I, WILLIAM H. H. STEVENSON, a citizen of the United States, residing at Baltimore, Maryland, have invented certain new and useful Improvements in Can-Heading Machines, of which the following is a specification.

My invention relates to can heading machines, and my object is to provide a simple, effective and inexpensive form of machine of the rotary type in which rotary carriers have thereon a plurality of clamping jaws and plungers which take the bodies and heads in succession from a suitable feeding trough and during the rotation place the heads upon the bodies and then discharge the headed cans at another point in the rotation of the carriers.

The invention consists in the features, combination and arrangement of parts herein described and particularly pointed out in the claims.

Figure 1:
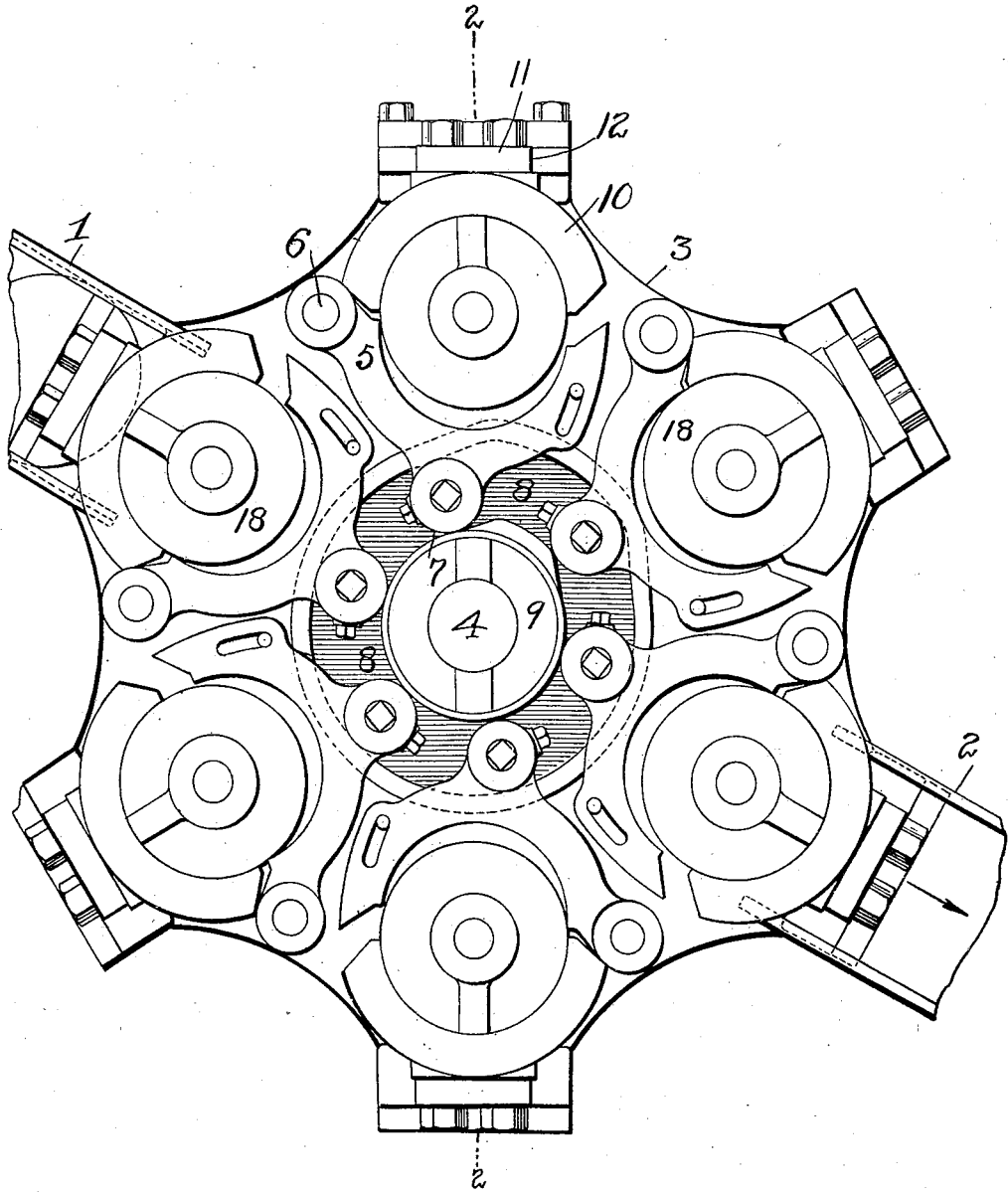
Figure 8:
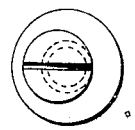
Figure 9:
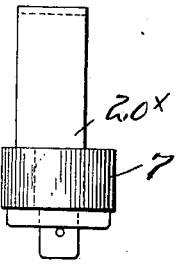
Figure 3:
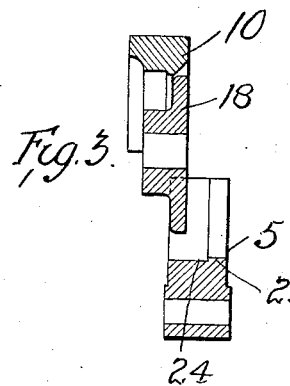

In the accompanying drawing,—Figure 1 is a front view of one of the carriers employed in carrying out my invention, said carrier having thereon my improvement. Fig. 2 is a central vertical section of Fig. 1. Fig. 3 is a sectional view similar to Fig. 1, showing only however a portion of the machine but with the heading elements in a different position from that indicated in the upper part of Fig. 1. Figs. 4, 5, 6 and 7 are views of the heading elements showing the different relative positions assumed by them at different stages of the operation. Figs. 8 and 9 are views of an eccentric journal pin.

In these drawings, the trough or channel by which the cans are fed to the machine is indicated at 1 and the discharge trough or channel at 2, this being located at a point diametrically opposite the feed trough. The carrier comprises disks or plates 3, 3′ keyed to a shaft 4 to which rotary movement may be imparted in any suitable manner. This carrier has pivoted thereto a series of inner jaws 5, the pivoted points of said jaws being indicated at 6. A set of these jaws is carried by each disk 3, or 3′. These jaws also have each an antifriction roll 7 moving in cam ways 8 formed in plates or disks 9, which are supported in fixed relation to a carrier in any suitable manner. These cams 8 surround the shaft 4 and as the carriers are rotated by the shaft, the jaws or clamps 5 are moved inwardly and outwardly by reason of their antifriction rollers traveling in the cam ways 8. The carrier disks 3 3′ each support and carry also a series of outer jaws or clamps 10 which are arranged to have sliding movement along lines parallel with the axis of rotation. These jaws are carried by slides 11 adapted to reciprocate in slide ways 12 of the carrier-disks, said slides having antifriction rolls 13 connected therewith, which run in cam ways 14—14′, it being understood also that there are one of these cam ways for each series of slides, or in other words, for each side of the machine, as shown in Fig. 2. The cam ways 14—14′ are formed in brackets or standards 15—15′, which rest upon any suitable part of the frame or other support at 16, 16′, and which also have bearings for the shaft 4 at 17—17′. Further, the disks 3, 3′, of the carrier have supported therein each a series of plungers, the heads of which are of circular form, as indicated at 18—18′, and which are carried by the plunger stems 19—19′ having their bearings in the carrier disks. The rear ends of these stems carry antifriction rolls 20, which run in cam ways 21—21′, formed in the plates or disks 22, which latter are supported or connected with the frame work in any suitable manner.

By means of the several cams mentioned, the pivoted jaws will have a closing and opening movement in a radial direction as the carrier rotates, the jaws 10—10 will be given a sliding movement in a direction parallel with the axis of rotation and the plungers 18—18′ will also be given a sliding movement in the direction of said axis.

When a set of heading elements, consisting of the pivoted jaw, the sliding jaw, and the plunger on each carrier disk, arrives at the feeding-in point the sliding jaw 10 of each carrier disk will be in retracted position, indicated in Fig. 3, and this will be true also of the heading plunger 18, and further, the pivoted jaw will be in its innermost position, as indicated in Fig. 1. While the parts are in this position the can body and heads are fed into position, the said body resting with its ends upon the curved or inner clamps or jaws 5, as well as the heads. It will be seen from an inspection of Fig. 2 the bodies rest upon a shoulder or raised portion of the jaws 5 at 23, while the heads rest upon the depressed portion 24. The edge of the body projects slightly beyond the shoulder 24 so as to receive the flange of the can head. As the carriers revolve with the can and its heads in the position just described, the upper or outer clamping jaws perform their sliding movement to get in the position indicated in Fig. 2, directly over the inner jaws, and these inner jaws are moved radially outward so that the can body and its head are centered in relation to each other so that when the heading plungers move towards each other the heads at the opposite ends of the can body will be thrust on to the said body and thus the heading operation will be performed.

It will be understood that the operation at one end of the can is precisely the same as at the other end, and a complete set of heading elements comprises the two outer clamping jaws or molds, the two oppositely disposed inner clamps or molds and the two plungers.

Figure 4:
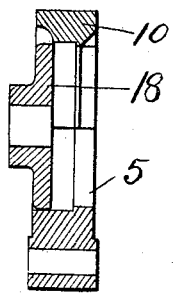
Figure 5:
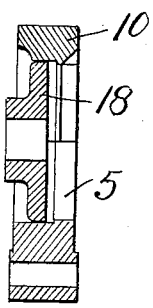
Figure 6:
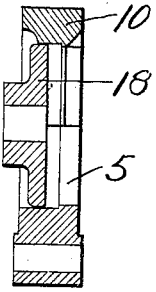
Figure 7:
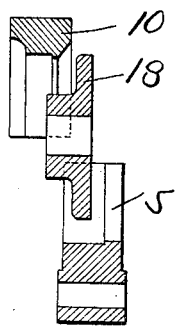

Referring now to the different positions assumed by the heading elements, it will be seen from Figs. 3, 4, 5, 6 and 7 which show the successive relative positions of the elements, that when in position to receive the can members, the jaws are in the position shown in Fig. 3. The next position of the parts is that indicated at the upper part of Fig. 2 at which the jaws 10, 10 have moved forward or towards each other, it being understood that the can parts are now in position between the jaws, having been fed into place while the parts were in the relative position shown in Fig. 3. The lower or swinging jaws 5 now move outwardly as shown in Fig. 4, and the can is centered thereby in relation to the plungers 18, 18' which move gradually forward or toward each other as shown in Fig. 5 at which time the heading operation is completed, the jaws 10, 10 being in their extreme position of approach and the plungers 18, 18' having at this time approached each other to the maximum degree. The plungers 18, 18' now recede slightly about 1/16 of an inch as indicated in Fig. 6. The jaws 10, however, remain in the same position relative to each other as they formerly occupied in Fig. 5. The position next assumed by the parts is that illustrated in Fig. 7 in which the jaws 10, 10 have moved back, so as to allow the can to be discharged and the inner jaws have now moved inwardly. The plungers however, remain in the same position as in Fig. 6 where they have moved back sufficiently for to afford clearance for the discharge of the cans and they then move back to the position indicated in Fig. 3.

The machine is driven through any suitable gearing connected with one end of the shaft.

The pins on which the rollers are journaled are made eccentric for taking up the wear, as shown in Figs. 8 and 9.

I claim as my invention:

1. A can heading machine, comprising carrier means, a series of radially movable clamping jaws thereon, a series of jaws slidably mounted to move in a direction parallel with the axis of rotation, and plungers also moving parallel with the axis of rotation and adapted to force the heads on to the bodies, substantially as described.

2. In combination, in a can heading machine, carrier means, a plurality of jaws pivoted thereto to move radially, a plurality of sliding jaws, one for each of the pivoted jaws, said sliding jaws moving in a direction parallel with the axis of rotation and plungers also moving in said direction, substantially as described.

3. In combination, the carrier means, a plurality of clamping jaws, each pivoted at one of its sides to the carrier, and having its free portion of substantially semicircular shape, the axis of said pivots being parallel with the axis of rotation, a plurality of sliding jaws moving in a direction parallel with the axis of rotation, and plungers also moving in a direction parallel with the axis of rotation, substantially as described.

4. In combination, the carrier means, the jaws pivoted thereon, the sliding jaws on the carrier means, the sliding plungers also on the carrier means, and the cam ways encircling the axis of rotation, substantially as described.

5. In combination, rotary carriers, a set of heading elements carried thereby and comprising a pair of jaws movable parallel with the axis of rotation, a pair of plungers also movable parallel with the axis of rotation, a pair of jaws movable towards and from the center of rotation and stationary cams for operating the jaws and the plungers.

6. In combination in a can heading machine, a series of outer molds, a series of inner swinging molds and an eccentric pin to adjust the inner molds, substantially as described.

In testimony whereof, I affix my signature in presence of two witnesses.

WILLIAM H. H. STEVENSON.

Witnesses:
HARRY L. DRAKE,
PARKE C. DIX.